US008434073B1

(12) United States Patent
Satish et al.

(10) Patent No.: US 8,434,073 B1
(45) Date of Patent: Apr. 30, 2013

(54) SYSTEMS AND METHODS FOR PREVENTING EXPLOITATION OF BYTE SEQUENCES THAT VIOLATE COMPILER-GENERATED ALIGNMENT

(75) Inventors: Sourabh Satish, Fremont, CA (US); Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 948 days.

(21) Appl. No.: 12/263,739

(22) Filed: Nov. 3, 2008

(51) Int. Cl.
*G06F 9/44* (2006.01)
*G06F 9/45* (2006.01)
*G06F 9/445* (2006.01)
*G06F 12/00* (2006.01)
*G06F 12/14* (2006.01)

(52) U.S. Cl.
USPC ........... 717/140; 717/120; 717/124; 717/132; 717/135; 717/136; 717/149; 717/151; 717/178; 726/16

(58) Field of Classification Search .................. None
See application file for complete search history.

(56) References Cited

U.S. PATENT DOCUMENTS

| | | | |
|---|---|---|---|
| 5,121,498 A * | 6/1992 | Gilbert et al. ................. | 717/149 |
| 6,862,553 B2 * | 3/2005 | Schwenke et al. ............ | 717/135 |
| 7,113,615 B2 | 9/2006 | Rhoads et al. | |
| 7,254,806 B1 * | 8/2007 | Yates et al. .................... | 717/136 |
| 7,266,476 B2 * | 9/2007 | Coburn et al. ................. | 717/135 |
| RE40,919 E | 9/2009 | Rhoads | |
| 7,827,312 B2 | 11/2010 | Ramaswamy et al. | |
| 7,840,849 B2 * | 11/2010 | O'Callahan ................... | 717/124 |
| 8,181,168 B1 * | 5/2012 | Lee et al. ....................... | 717/149 |
| 2002/0120921 A1 * | 8/2002 | Coburn et al. ................ | 717/140 |
| 2004/0107416 A1 * | 6/2004 | Buban et al. .................. | 717/170 |
| 2004/0239681 A1 | 12/2004 | Robotham et al. | |
| 2008/0025559 A1 | 1/2008 | Paxson | |
| 2008/0085031 A1 | 4/2008 | Estevez et al. | |
| 2008/0101604 A1 | 5/2008 | Kocher et al. | |
| 2008/0126803 A1 * | 5/2008 | Ginter et al. .................. | 717/178 |
| 2008/0127125 A1 * | 5/2008 | Anckaert et al. .............. | 717/136 |
| 2008/0250393 A1 * | 10/2008 | Bolene et al. ................. | 717/120 |

(Continued)

OTHER PUBLICATIONS

Monirul Sharif et al, Understanding Precision in Host Based Intrusion, 2007, Formal Analysis and Practical Models, [Retrieved on Dec. 14, 2011]. Retrieved from the internet: <URL: http://www.cc.gatech.edu/~giffin/papers/raid07/SSG+07.pdf>, pp. 1-21.*

(Continued)

*Primary Examiner* — Don Wong
*Assistant Examiner* — Anibal Rivera
(74) *Attorney, Agent, or Firm* — ALG Intellectual Property, LLC

(57) ABSTRACT

An exemplary method for preventing exploitation of byte sequences that violate compiler-generated instruction alignment may comprise: 1) identifying instantiation of a process, 2) identifying an address space associated with the process, 3) identifying, within the address space associated with the process, at least one control-transfer instruction, 4) determining that at least one byte preceding the control-transfer instruction is capable of resulting in an out-of-alignment instruction, and then 5) preventing the control-transfer instruction from being executed. In one example, the system may prevent the control-transfer instruction from being executed by inserting a hook in place of the intended instruction that executes the intended instruction and then returns control flow back to the instantiated process. Corresponding systems and computer-readable media are also disclosed.

18 Claims, 7 Drawing Sheets

U.S. PATENT DOCUMENTS

| | | | | |
|---|---|---|---|---|
| 2008/0288117 | A1* | 11/2008 | Nickerson | 726/16 |
| 2009/0077664 | A1* | 3/2009 | Hsu et al. | 726/24 |
| 2009/0249318 | A1* | 10/2009 | Ayguade et al. | 717/151 |
| 2009/0282393 | A1* | 11/2009 | Costa et al. | 717/132 |
| 2009/0282477 | A1* | 11/2009 | Chen et al. | 726/22 |

OTHER PUBLICATIONS

Jedidiah Richard Crandall, Capturing and Analyzing Internet Worms, Jun. 2007, [Retrieved on Nov. 19, 2012]. Retrieved from the internet: <URL: http://www.cs.ucdavis.edu/~su/theses/JC-dissertation.pdf> 156 Pages (1-145).*

U.S. Appl. No. 12/264,101, filed Nov. 3, 2008, Satish et al.

"Xot 0.5 Beta2"; released Jul. 2001; XenoZ; http://www.megasecurity.org/trojans/x/xot/Xot0.5b2.html.

Buchanan, Erik; When Good Instructions Go Bad: Generalizing Return-Oriented Programming to RISC; Proceedings of CCS 2008, AMC Press; Oct. 2008; 12 Pages.

Shacham, Hovav; The Geometry of Innocent Flesh on the Bone: Return-into-libc without Function Calls (on the x86); Proceedings of CCS 2007, AMC Press; Oct. 2007; 29 Pages.

Moyer, Shawn; (un) Smashing the Stack Ocerflows, Coutermeasures and the Real World; BlackHat USA 2007;45 Pages.

Final Office Action received in U.S. Appl. No. 12/264,101, dated Mar. 2, 2012.

Non-Final Office Action received in U.S. Appl. No. 12/264,101, dated Sep. 16, 2011.

* cited by examiner

SYSTEMS AND METHODS FOR PREVENTING EXPLOITATION OF BYTE SEQUENCES THAT VIOLATE COMPILER-GENERATED ALIGNMENT

BACKGROUND

Certain computing architectures (such as the x86 architecture) do not require that program instructions be of a certain length or begin or end on predefined boundaries. Such architectures permit execution of random byte sequences within programs, even if the execution of such byte sequences violates an instruction alignment generated by a compiler, so long as the byte sequences that follow represent viable instructions. For example, a program's stack may point to and execute the second byte in a five-byte instruction, so long as the bytes that follow the second byte represent viable instructions.

Because of this, researchers have determined that malicious programmers may exploit legitimate programs by identifying and executing out-of-alignment byte sequences within a program (i.e., byte sequences that, when executed, violate an instruction alignment generated by a compiler) that may result in viable instructions. Researchers have determined that malicious programmers may identify such out-of-alignment byte sequences by: 1) analyzing the address space associated with a legitimate process, 2) identifying a byte or series of bytes within the address space that may result in a control-transfer instruction (such as a return instruction) that may direct control flow of the process, and then 3) determining whether any of the bytes that precede the control-transfer instruction represent viable and potentially useful instructions (such as system calls).

Malicious programmers may then create shell code that directs control flow of the program to jump to each useful byte sequence. For example, a malicious programmer may create shell code that exploits a buffer overflow in a legitimate program in order to overwrite the program's stack. The shell code may then cause the overwritten stack to return a value that jumps to an out-of-alignment byte sequence within the legitimate program that executes an instruction desired by the malicious programmer (such as a system call to create a file, to open a file, or to write to a memory location). The shell code may then cause the overwritten stack to continue to make returns to byte sequences that perform the various functions desired by the malicious programmer. In this way, the malicious programmer may, without inserting any code, cause a legitimate program to perform an unintended, and potentially malicious, action.

SUMMARY

As will be described in greater detail below, the instant disclosure generally relates to systems and methods for preventing malicious programmers from exploiting byte sequences that violate a compiler-generated instruction alignment. In one example, such a method may comprise: 1) identifying instantiation of a process, 2) identifying at least one control-transfer instruction (such as a return instruction) within the process' address space, 3) determining whether one or more bytes preceding the control-transfer instruction represent at least one viable out-of-alignment instruction (such as a system call), and then 4) preventing the control-transfer instruction from being executed.

In one example, the system may prevent the control-transfer instruction from being executed by: 1) identifying the originally intended instruction within the instantiated process that contains the control-transfer instruction, 2) removing the intended instruction from the instantiated process, and then 3) inserting a hook in place of the intended instruction. The hook may then redirect control flow to a security patch that: 1) executes the intended instruction (or an instruction that results in functionality that is equivalent or substantially equivalent to the functionality of the intended instruction) and then 2) returns control flow back to the instantiated process.

The security patch may be located within either the address space associated with the instantiated process or within an address space associated with a separate security process. In some embodiments, the system may rigorously test the hook prior to enabling the same on a live machine to determine whether changes made by the hook will negatively affect the intended control flow of the process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
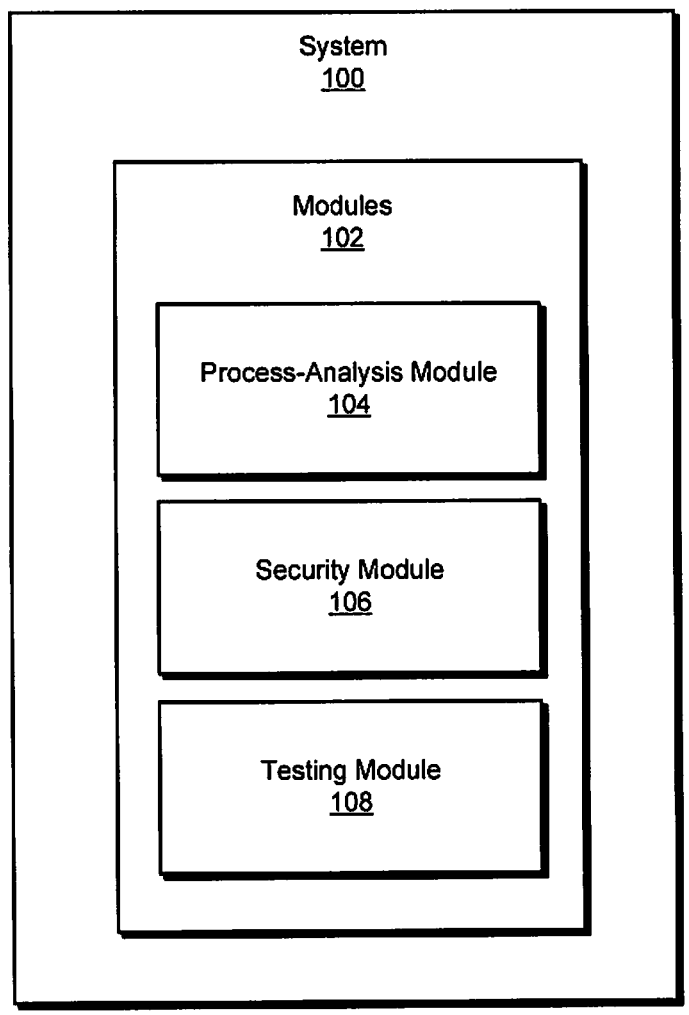
FIG. 1 is a block diagram of an exemplary system for preventing exploitation of byte sequences that violate compiler-generated instruction alignment according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for preventing malicious programmers from exploiting byte sequences that violate compiler-generated instruction alignment. The following will provide, with reference to FIG. 1, a detailed description of an exemplary system for preventing the exploitation of such byte sequences. A detailed description of a corresponding exemplary computer-implemented method will also be provided in connection with FIGS. 2-5. In addition, descriptions of an exemplary computing system and network architecture capable of implementing one or more of the embodiments described and/or illustrated herein will also be provided in connection with FIGS. 6 and 7.

FIG. 1 is a block diagram of an exemplary system 100 for preventing exploitation of byte sequences that violate compiler-generated instruction alignment. As illustrated in this figure, exemplary system 100 may comprise one or more modules 102 for performing one or more tasks. For example, exemplary system 100 may comprise a process-analysis module 104 for identifying byte sequences within legitimate processes that may result in control-transfer instructions that may be exploited by malicious programmers. Exemplary system 100 may also comprise a security module 106 for preventing such control-transfer instructions from being executed. In addition, as will be explained in greater detail below, exemplary system 100 may comprise a testing module 108 for determining whether changes made to an instantiated process to prevent execution of control-transfer instructions will negatively affect the intended control flow of the process. Although not illustrated in FIG. 1, exemplary system 100 may also comprise one or more additional modules.

In certain embodiments, one or more of modules 102 in FIG. 1 may represent one or more software applications or programs that, when executed by a computing device, may cause the computing device to perform one or more tasks required to prevent the exploitation of byte sequences that violate compiler-generated instruction alignment. For example, as will be described in greater detail below, one or more of modules 102 may represent software modules configured to run on one or more computing devices, such as computing system 610 in FIG. 6 and/or portions of exemplary network architecture 700 in FIG. 7. One or more modules 102 in FIG. 1 may also represent all or portions of one or more special-purpose computers configured to perform one or more tasks.

Figure 2:
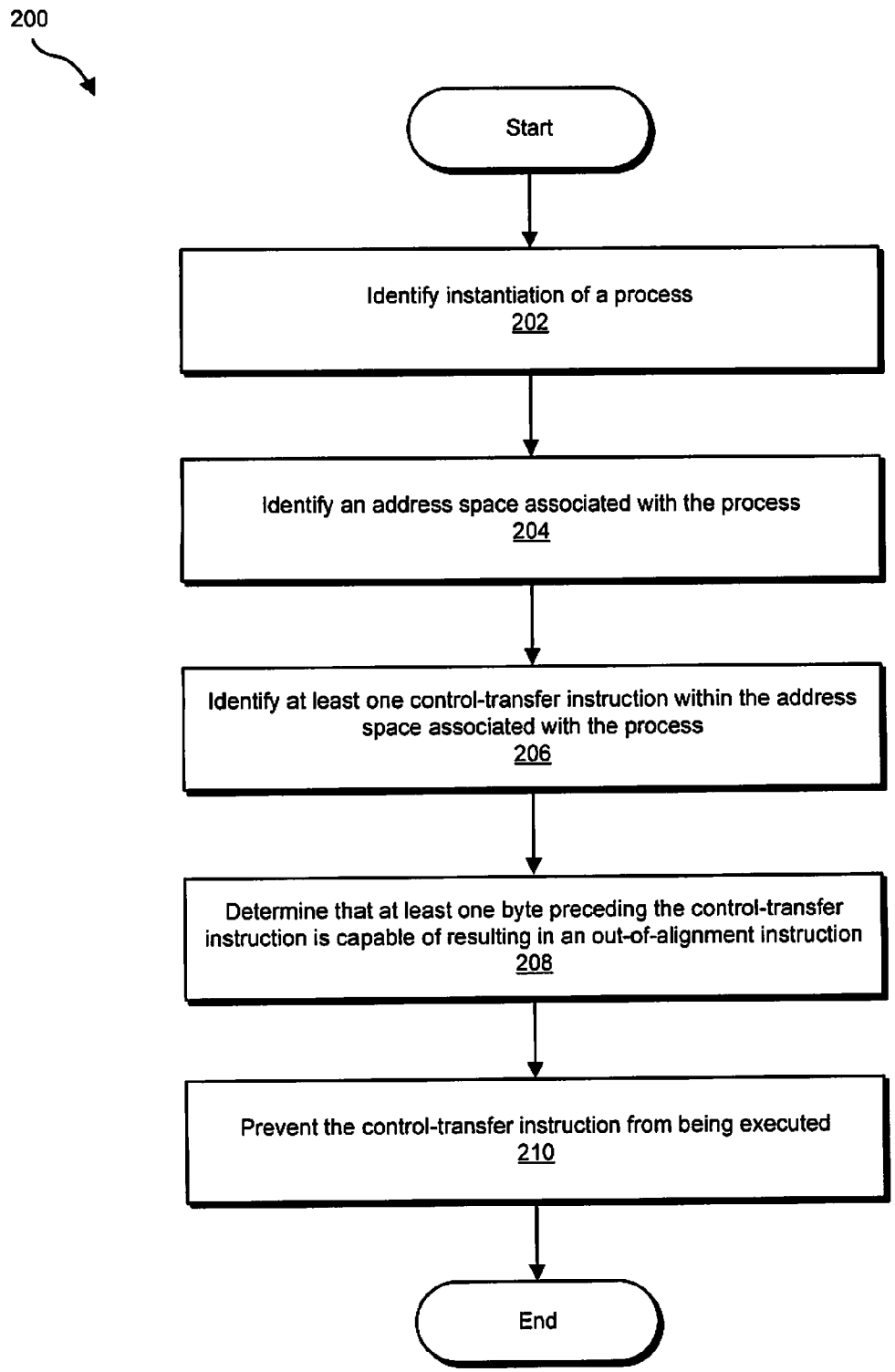
FIG. 2 is a flow diagram of an exemplary method for preventing exploitation of byte sequences that violate compiler-generated instruction alignment.

FIG. 2 is a flow diagram of an exemplary computer-implemented method 200 for preventing the exploitation of byte sequences that violate compiler-generated instruction alignment. As illustrated in this figure, at step 202 the system may identify instantiation of a process. For example, process-analysis module 104 in FIG. 1 may identify a process instantiated on exemplary computing system 610 in FIG. 6. The term "instantiation," as used herein, generally refers to loading or mapping a process into memory of a computing system. For example, process-analysis module 104 in FIG. 1 may identify a process loaded or mapped into system memory 616 of exemplary computing system 610 in FIG. 6. In some examples, process-analysis module 104 may identify a process after it is loaded into memory of a computing device, but before the computing device has begun executing the process.

At step 204, the system may identify an address space associated with the process. For example, process-analysis module 104 in FIG. 1 may identify an address space 300 in FIG. 3 assigned by an operating system of exemplary computing system 610 in FIG. 6 to the instantiated process identified in step 202. As used herein, the phrase "address space" generally refers to a range of discrete addresses assigned to a process by an operating system. Each address may correspond to a physical or virtual memory location.

At step 206, the system may identify at least one control-transfer instruction within the process' address space. The phrase "control-transfer instruction" generally refers to any instruction that may direct the control flow of a process. Examples of control-transfer instructions include, without limitation, returns, calls (such as system calls), jumps, and interrupts.

Figure 3:
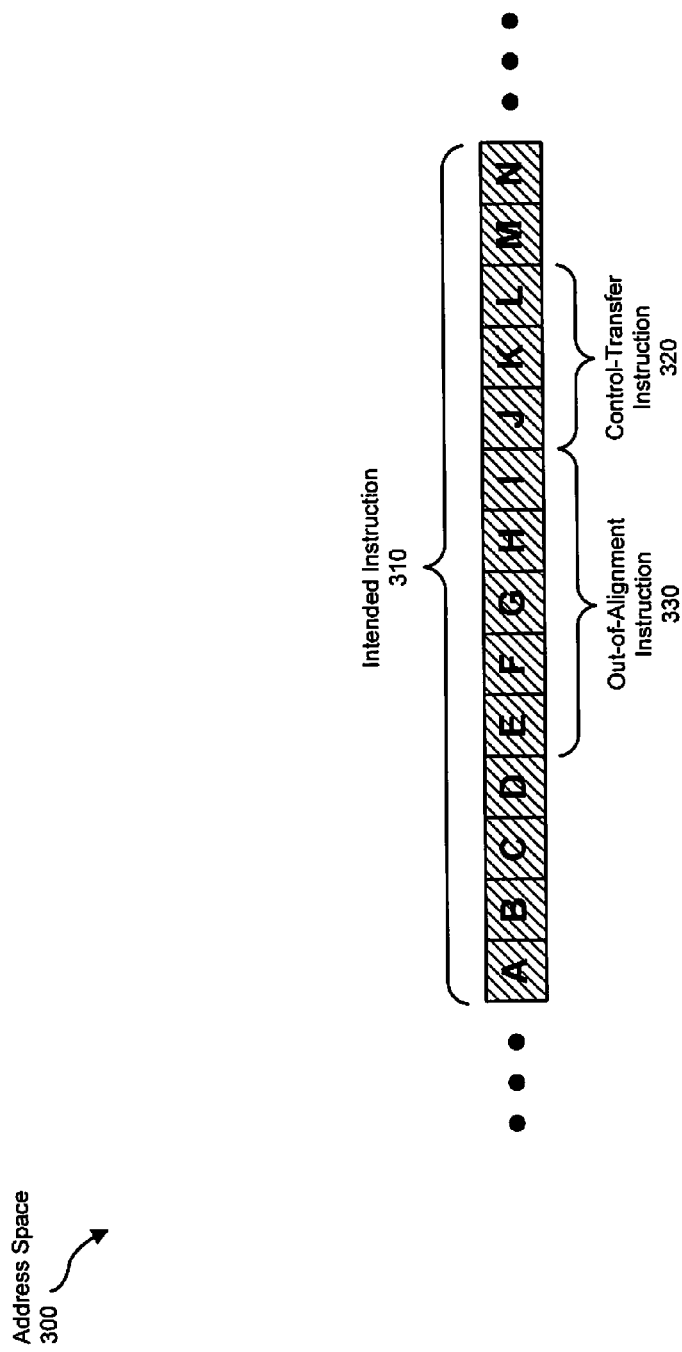
FIG. 3 is a block diagram illustrating an address space for an exemplary instruction that contains a control-transfer instruction.

For example, process-analysis module 104 in FIG. 1 may determine that bytes J-L within address space 300 in FIG. 3 represent a control-transfer instruction 320, such as a return instruction. As illustrated in this figure, control-transfer instruction 320 may represent a portion of an intended instruction 310. The bytes forming control-transfer instruction 320 may be found in the middle of an intended instruction, at the end of an intended instruction, and/or may comprise portions of two different intended instructions (such as the end of a first intended instruction combined with the beginning of a second intended instruction).

At step 208, the system may determine that at least one byte preceding the control-transfer instruction identified in step 206 is capable of resulting in a viable out-of-alignment instruction. For example, process-analysis module 104 in FIG. 1 may determine that bytes E-I of intended instruction 310 in FIG. 3 may, when executed, result in an out-of-alignment system call 330. The phrase "out-of-alignment instruction," as used herein, generally refers to sequences of out-of-alignment bytes within a legitimate process that, when executed, result in viable instructions. Examples of out-of-alignment instructions include, without limitation, system calls (such as calls to open, read, and write) or the like.

Out-of-alignment instructions may represent a portion of an intended instruction within a legitimate process and/or portions of two different intended instructions within a legitimate process (such as a byte sequence that comprises the end of a first intended instruction combined with the beginning of a second intended instruction). Similarly, out-of-alignment instructions may be located in the middle of an intended instruction, at the end of an intended instruction, and/or may comprise portions of two different intended instructions (such as the end of a first intended instruction combined with the beginning of a second intended instruction). In certain embodiments, the system may iterate through steps 206 and 208 until each out-of-alignment instruction is identified.

At step 210, the system may prevent the control-transfer instruction from being executed. For example, security module 106 in FIG. 1 may prevent the execution of control-transfer instruction 320 in FIG. 3.

Step 210 may be performed in a variety of ways. In one example, the system may prevent a control-transfer instruction from being executed by: 1) identifying an intended instruction within the instantiated process that contains the control-transfer instruction, 2) removing the intended instruction from the instantiated process, and then 3) inserting a hook in place of the intended instruction that redirects control flow to a security patch (located within either the address space associated with the instantiated process or within an address space associated with a separate security process) that executes the intended instruction and then returns control flow back to the instantiated process. The term "hook," as used herein, generally refers to any technique that may be used to redirect control flow of a process.

Figure 4:
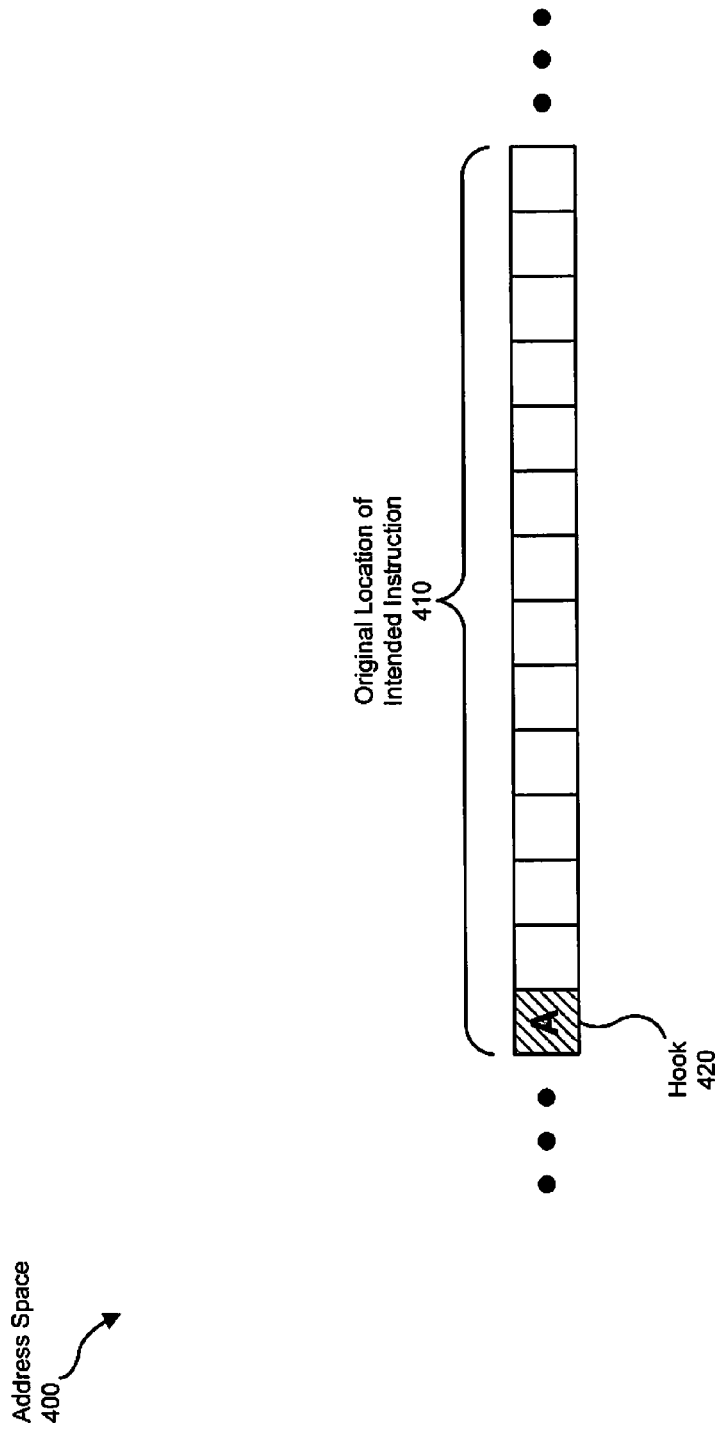
FIG. 4 is a block diagram of an address space associated with an exemplary process from which an intended instruction containing a control-transfer instruction has been removed.

For example, security module 106 in FIG. 1 may remove intended instruction 310 in FIG. 3 from its location within address space 300. As illustrated in FIG. 4, security module 106 may then insert a hook 420 in place of the originally intended instruction. In certain embodiments, and as illustrated in FIG. 4, hook 420 may be placed at the beginning of the original location of the intended instruction 310. In addition, in some examples hook 420 may be inserted in place of several originally intended instructions, each of which may contain control-transfer instructions that may be exploited by malicious programmers, since a single originally intended instruction may not be long enough to properly encode hook 420.

Figure 5:
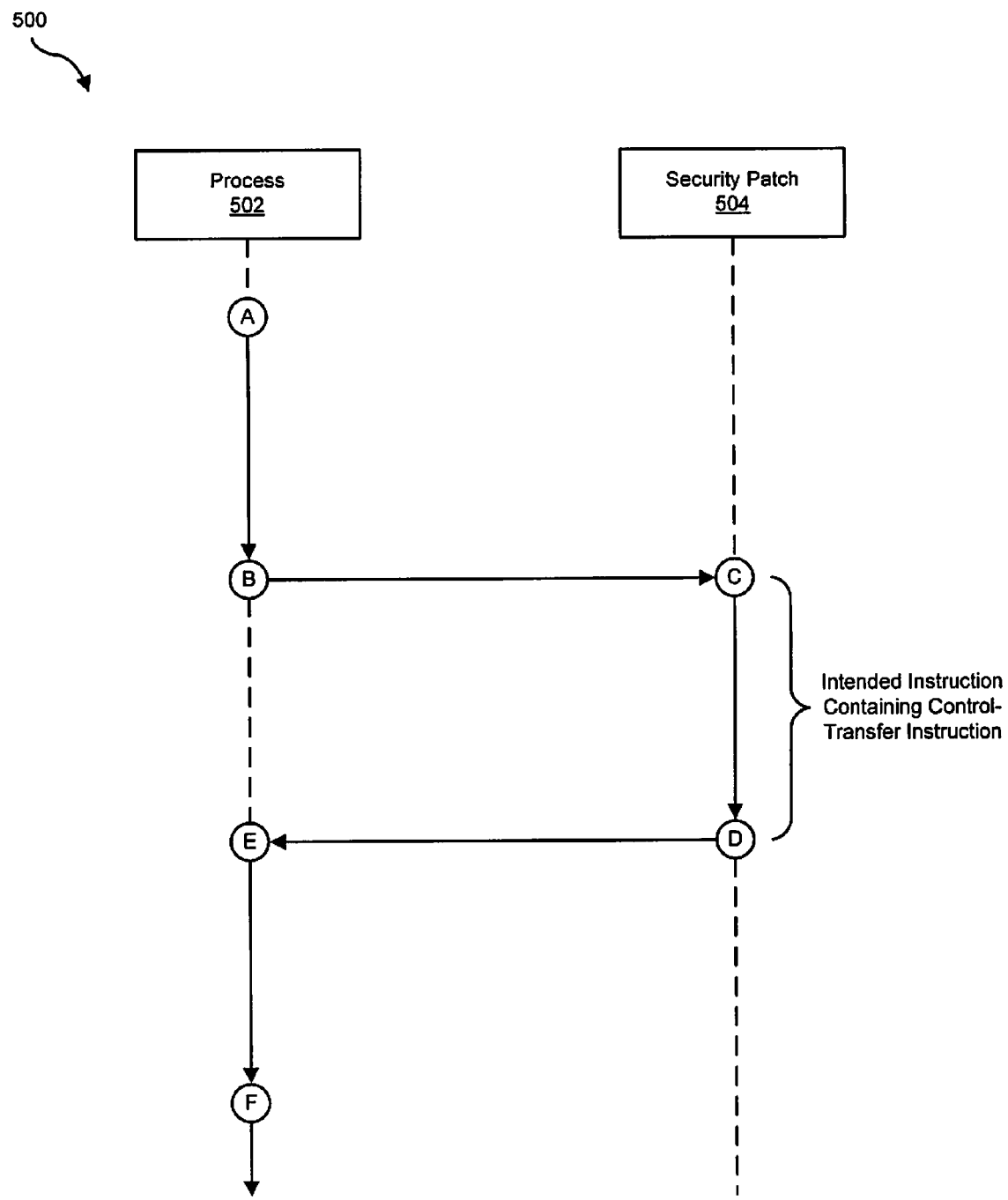
FIG. 5 is a flow diagram of an exemplary method for preventing execution of a control-transfer instruction.

In certain examples, hook 420 may redirect control flow of the process to a security patch that executes the intended instruction and then returns control flow back to the process. For example, as illustrated in FIG. 5, control flow of a process 502 may proceed from point A to point B, during which time process 502 may execute its intended instructions. At point B, process 502 may encounter an instruction that contains a control-transfer instruction that may be exploited by a malicious programmer. At this point, a hook (such as hook 420 in FIG. 4) may then redirect control flow to a security patch 504. From point C to point D, security patch 504 may execute the intended instruction that contains the control-transfer instruction. Security patch 504 may then return control flow back to process 502. Process 502 may then continue executing additional instructions from point E to point F.

A security patch, such as security patch 504 in FIG. 5, may execute an intended instruction that contains a control-transfer instruction in a variety of ways. In one example, security patch 504 may simply execute the sequence of bytes (such as bytes A-N in FIG. 3) that represent the intended instruction that was removed from the original process. In an additional embodiment, security patch 504 may execute a different byte sequence that may result in functionality that is equivalent or substantially equivalent to the functionality of the originally intended instruction. Security patches may be located within either the address space associated with the original instantiated process or within an address space associated with a separate security process. In certain examples, a testing module, such as testing module 108 in FIG. 1 may test any hooks inserted into the control flow of the process to determine whether such hooks negatively affect the intended control flow of the process.

As detailed above, the systems and methods disclosed herein may prevent potentially malicious control-transfer instructions from being executed. As such, these systems and methods may prevent shell code that has been compiled against an executable from overflowing a stack and then executing malicious instructions by jumping from one arbitrary byte location to another. The systems and methods described herein may apply to both architectures that enforce instruction boundaries (such as MIPS and RISC) and those that don't (such as x86 architectures).

Figure 6:
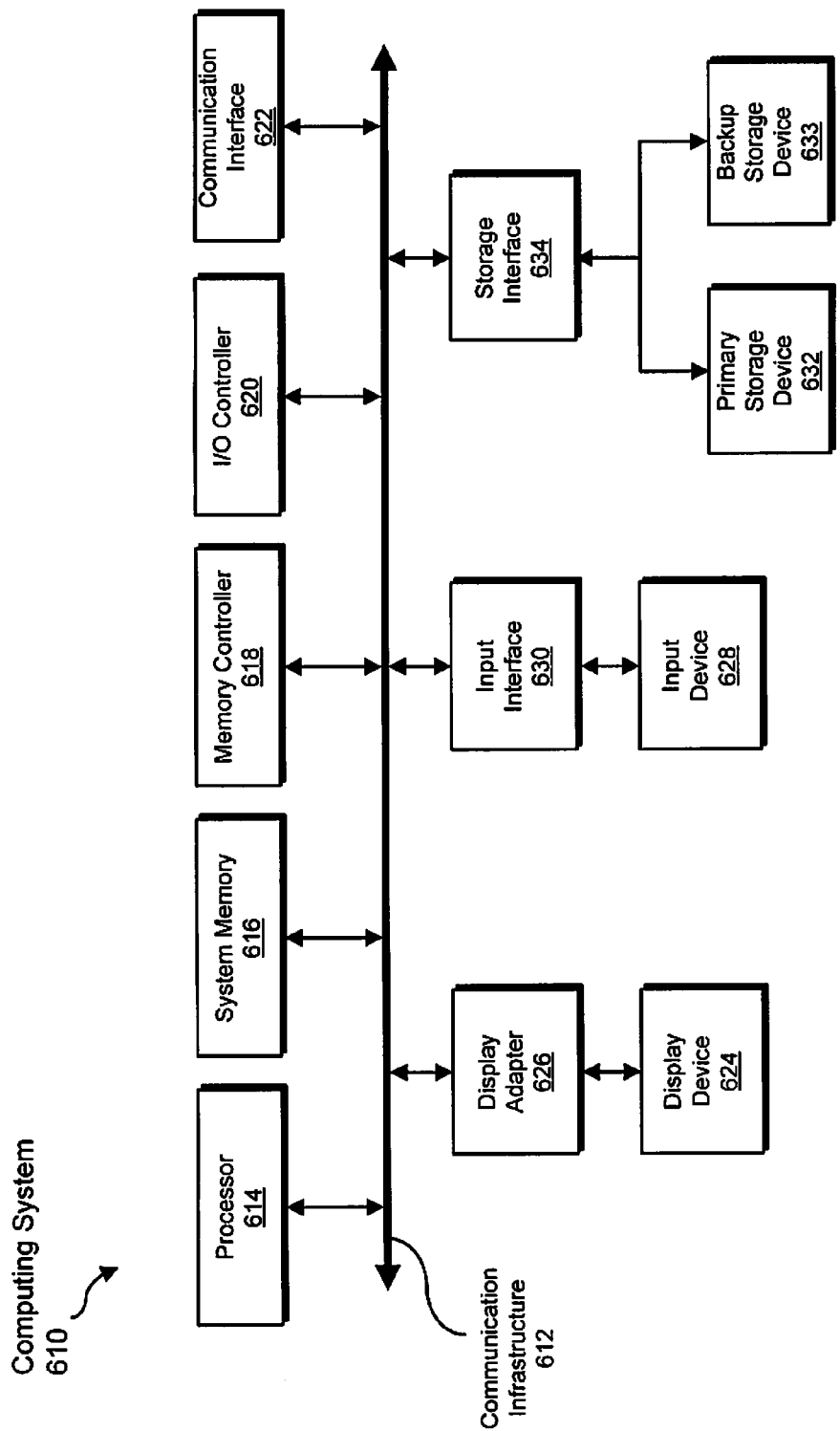
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, preventing, removing, inserting, and redirecting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, preventing, removing, inserting, and redirecting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage identifying, determining, preventing, removing, inserting, and redirecting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless I EEE 802.11 network), a personal area network (such as a BLUETOOTH network or an IEEE 802.15 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, preventing, removing, inserting, and redirecting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, preventing, removing, inserting, and redirecting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, determining, preventing, removing, inserting, and redirecting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 7 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
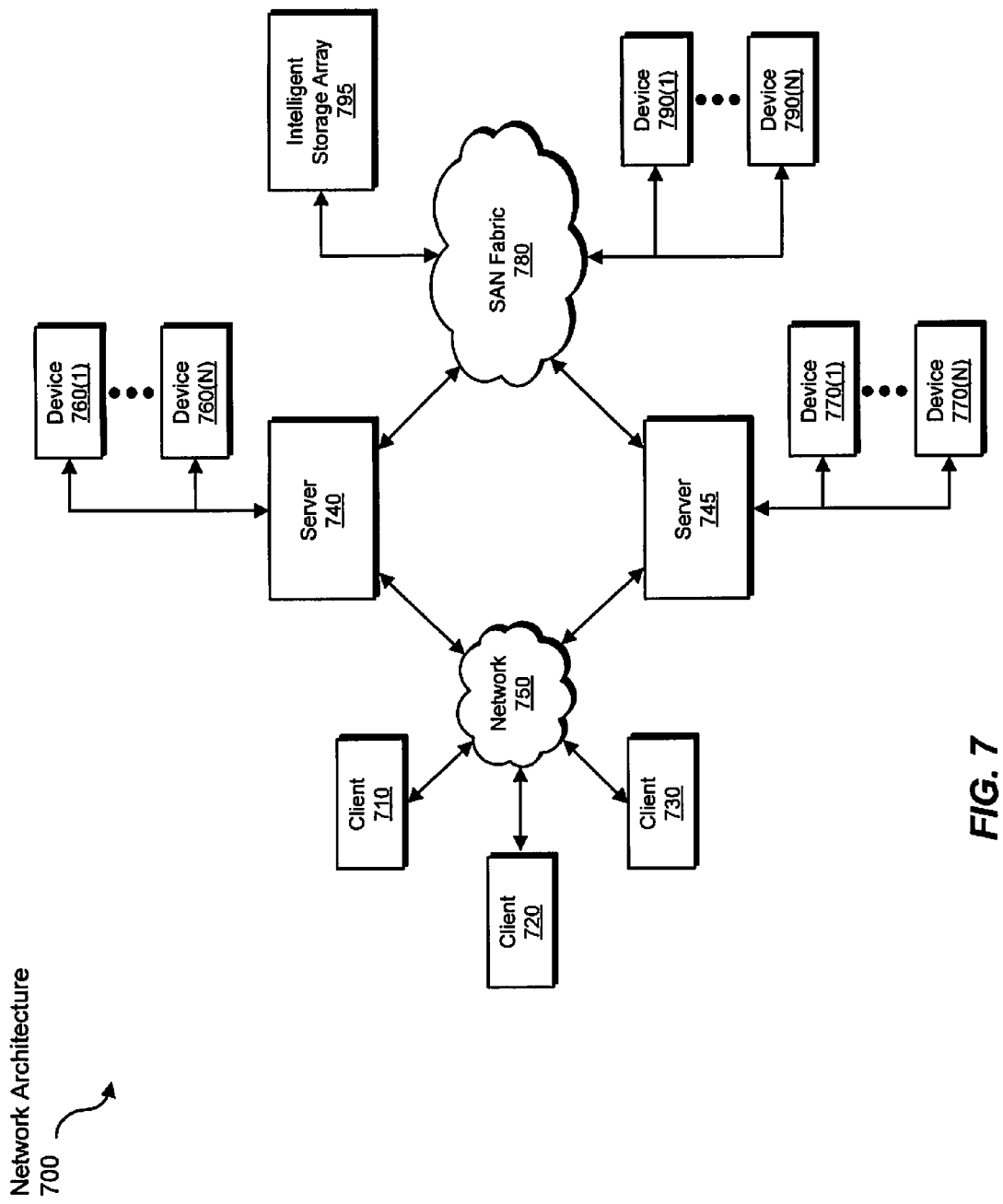
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, preventing, removing, inserting, and redirecting steps disclosed herein. Network architecture 700 may also be used to perform and/or be a means for performing other steps and features set forth in the instant disclosure.

As detailed above, one or more of the systems described herein may perform and/or be a means for performing either alone or in combination with other elements, one or more of the exemplary methods described and/or illustrated herein. For example, the systems described herein may perform a method for preventing exploitation of control-transfer instructions within legitimate processes that comprises: 1) identifying instantiation of a process, 2) identifying an address space associated with the process, 3) identifying, within the address space associated with the process, at least one control-transfer instruction, 4) determining that at least one byte preceding the control-transfer instruction is capable of resulting in an out-of-alignment instruction, and then 5) preventing the control-transfer instruction from being executed.

In one example, the system may prevent control-transfer instructions from being executed by: 1) identifying an intended instruction within the instantiated process that contains a control-transfer instruction, 2) removing the intended instruction from the instantiated process, and then 3) inserting a hook in place of the intended instruction that redirects control flow to a security patch located within either the address space associated with the instantiated process or within an address space associated with a separate security process. The security patch may then execute the intended instruction and then return control flow back to the instantiated process. The method may also comprise determining whether the hook negatively affects intended control flow of the process.

In one example, determining that at least one byte preceding the control-transfer instruction is capable of resulting in an out-of-alignment instruction may comprise determining that at least one byte preceding the control-transfer instruction represents at least one valid instruction. In addition, identifying at least one control-transfer instruction within the address space associated with the process may comprise identifying each control-transfer instruction within the address space associated with the process. The control-transfer instruction may comprise a portion of an intended instruction within the process and/or portions of two different intended instructions within the process.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing exploitation of byte sequences that violate compiler-generated instruction alignment, the method comprising:
    identifying instantiation of a process;
    identifying an address space associated with the process;
    identifying, within the address space associated with the process, at least one control-transfer instruction capable of directing control flow of the process;
    determining that at least one byte that precedes the control-transfer instruction is capable of resulting in an out-of-alignment instruction that, when executed contrary to a compiler-generated instruction alignment for the process, results in at least one valid instruction;
    preventing the control-transfer instruction from being executed contrary to the compiler-generated instruction alignment for the process by:
        identifying an intended instruction within the process that contains the control-transfer instruction;
        replacing the intended instruction with a hook that redirects control flow to a security patch that executes the intended instruction and then returns control flow back to the process;
    upon replacing the intended instruction with the hook, allowing the process to execute.

2. The method of claim 1, wherein the security patch is located within the address space associated with the process.

3. The method of claim 1, wherein the security patch is located within an address space associated with a separate security process.

4. The method of claim 1, further comprising, prior to allowing the process to execute, determining whether the hook negatively affects intended control flow of the process.

5. The method of claim 1, wherein the out-of-alignment instruction comprises a portion of, but less than the entirety of, at least one of:
    the intended instruction within the process;
    two different intended instructions within the process.

6. The method of claim 1, wherein the control-transfer instruction comprises:
    a return instruction;
    a jump;
    an interrupt;
    a call.

7. The method of claim 1, wherein the out-of-alignment instruction comprises a system call.

8. The method of claim 1, wherein the control-transfer instruction comprises a portion of, but less than the entirety of, at least one of:
    the intended instruction within the process;
    two different intended instructions within the process.

9. The method of claim 1, wherein identifying the control-transfer instruction within the address space associated with the process comprises identifying each control-transfer instruction within the address space associated with the process.

10. A system for preventing exploitation of byte sequences that violate compiler-generated instruction alignment, the system comprising:
    a process-analysis module programmed to:
        identify instantiation of a process;
        identify an address space associated with the process;
        identify, within the address space associated with the process, at least one control-transfer instruction capable of directing control flow of the process;
        determine that at least one byte that precedes the control-transfer instruction is capable of resulting in an out-of-alignment instruction that, when executed contrary to a compiler-generated instruction alignment for the process, results in at least one valid instruction;
    a security module programmed to prevent the control-transfer instruction from being executed contrary to the compiler-generated instruction alignment for the process by:
        identifying an intended instruction within the process that contains the control-transfer instruction;
    replacing the intended instruction with a hook that redirects control flow to a security patch that executes the intended instruction and then returns control flow back to the process;
        upon replacing the intended instruction with the hook, allowing the process to execute;
    at least one processor configured to execute the process-analysis module and the security module.

11. The system of claim 10, wherein the security patch is located within the address space associated with the process.

12. The system of claim 10, wherein the security patch is located within an address space associated with a separate security process.

13. The system of claim 10, further comprising a testing module programmed to determine, prior to allowing the process to execute, whether the hook negatively affects intended control flow of the process.

14. The system of claim 10, wherein the out-of-alignment instruction comprises a portion of, but less than the entirety of, at least one of:
    the intended instruction within the process;
    two different intended instructions within the process.

15. The system of claim 10, wherein the control-transfer instruction comprises:
    a return instruction;
    a jump;
    an interrupt;
    a call.

16. The system of claim 10, wherein the out-of-alignment instruction comprises a system call.

17. The system of claim 10, wherein the control-transfer instruction comprises a portion of, but less than the entirety of, at least one of:
- the intended instruction within the process;
- two different intended instructions within the process.

18. A non-transitory computer-readable medium that, when executed by a computing device, causes the computing device to:
- identify instantiation of a process;
- identify an address space associated with the process;
- identify, within the address space associated with the process, at least one control-transfer instruction capable of directing control flow of the process;
- determine that at least one byte that precedes the control-transfer instruction is capable of resulting in an out-of-alignment instruction that, when executed contrary to a compiler-generated instruction alignment for the process, results in at least one valid instruction;
- prevent the control-transfer instruction from being executed contrary to the compiler-generated instruction alignment for the process by:
    - identifying an intended instruction within the process that contains the control-transfer instruction;
    - replacing the intended instruction with a hook that redirects control flow to a security patch that executes the intended instruction and then returns control flow back to the process;
- upon replacing the intended instruction with the hook, allow the process to execute.

\* \* \* \* \*